Oct. 21, 1941.  H. E. BOWERS  2,259,727
TEMPERING GLASS
Filed April 10, 1939
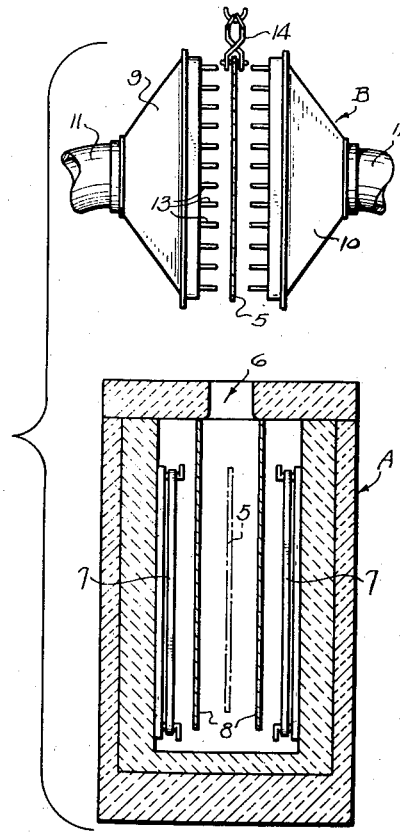
Fig. 1.
Fig. 2.
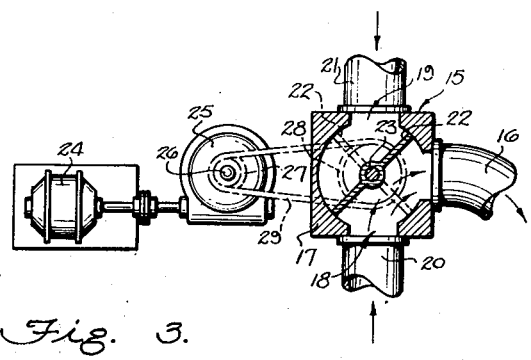
Fig. 3.
Inventor
HAROLD E. BOWERS.
By Frank Fraser,
Attorney Patented Oct. 21, 1941

2,259,727

UNITED STATES PATENT OFFICE 2,259,727

TEMPERING GLASS

Harold E. Bowers, Toledo, Ohio, assignor to Libbey-Owens-Ford Glass Company, Toledo, Ohio, a corporation of Ohio Application April 10, 1939, Serial No. 266,985

4 Claims. (Cl. 49—89)

The present invention relates to an improved method and apparatus for the tempering or thermal toughening of glass.

In the tempering of glass articles, such as flat sheets or plates, the sheets are first heated to a temperature lying between the strain and softening temperatures of the glass, and then subjected immediately to a sudden cooling or chilling operation. The chilling of the glass is ordinarily accomplished by placing the heated sheets between spaced blower heads and subjecting them to jets or blasts of cooling air.

Heretofore, considerable difficulty has been experienced in the heat-treatment of relatively thin sheets or plates of glass by this method of air cooling, and I believe that this is due to the fact that the thin glass cools so rapidly that not enough stress or tension is released therefrom above the strain point of the glass. Thus, the release of stress can occur only above the strain point and the time interval during which the temperature of the central layer of the glass sheets remains above the strain point is so short that the release of stress is materially inhibited. Since the amount of stress which is released from the glass above the strain point will determine the permanent strain remaining in the glass sheets after they have cooled to room temperature, it is important that the release of stress be properly controlled to provide a glass having maximum resistance to thermal shock.

It is the aim of this invention to improve the tempering of glass, and particularly relatively thin glass sheets or plates, by prolonging the time interval during which the central layers of the glass maintain a temperature above the strain point, thereby allowing more time for the release of stress and the establishment of a permanent strain pattern in the glass. Briefly, this is accomplished by first heating the glass sheets to a temperature lying between the strain and softening temperatures of the glass and then subjecting the heated sheets to alternate blasts of cold and hot air. The purpose of alternately blowing cold and hot air upon the sheets is to send a periodic temperature wave through the glass which will maintain the interior or central layers of the sheets at a temperature above the strain point of the glass for a longer period, whereby to permit more time for the release of stress. The upper limit of the hot air temperature will be such that after blowing has begun the surface temperature of the glass sheets will not again rise as high as the strain point which will prevent the removal of any strain by annealing. By following such a method, permanent strains can be established in a body of glass, and especially in thin sheets or plates of glass, by which increased resistance to thermal and mechanical shock is obtained.

Other objects and advantages of the invention will become more apparent during the course of the following description, when taken in connection with the accompanying drawing.

In the drawing, wherein like numerals are employed to designate like parts throughout the same:

Fig. 1 is a view of one form of tempering apparatus which may be employed in carrying out the invention;

Fig. 2 is a face view of one of the blower heads showing the glass sheet in position with respect thereto and partially broken away; and Fig. 3 is a sectional view of one type of reversing valve which may be used to control the alternate blowing of hot and cold air upon the sheet.

In the embodiment illustrated in the drawing, the means for heating the glass sheets comprises a furnace designated in its entirety by the letter A, while the means for subsequently chilling or cooling the sheets is designated generally by the letter B. The cooling means B is here shown as being arranged directly above the furnace A so that the glass sheet 5, after being heated within the furnace, can be transferred directly to the cooling means without any undue loss of heat and without being adversely affected by atmospheric conditions during the transfer.

The furnace A is preferably of the electrically heated type and is provided with a top opening 6 through which the glass sheets 5 to be treated may be inserted and removed. Any suitable covering can be used for the opening 6 as will be readily understood. For the purpose of heating the furnace, electrical heating elements 7 may be used in conjunction with baffle plates 8 and, by means of any conventional indicating and control mechanism, the temperature of the furnace can be regulated to heat the glass sheets to a temperature lying between the strain and softening temperatures of the glass composition.

When the glass sheet has been heated to the proper temperature within the furnace, it is lifted therefrom through the top opening 6 and subjected immediately to the action of the cooling means B. The cooling means comprises spaced blower heads 9 and 10 connected by means of flexible conduits 11 and 12 respectively to suitable blowing apparatus so that blasts of air can be directed simultaneously upon opposite surfaces of the glass sheet 5 when brought into position between the said blower heads. Each blower head may be provided with a plurality of nipples 13 through which jets of air are directed against the sheet. The glass sheet may be supported in any desired manner such as by suspending it from relatively small hooks or tongs 14 engaging the same adjacent its upper edge. It will of course be appreciated that the invention is not limited to the particular type of furnace herein disclosed nor to the particular relationship between the furnace and blower heads.

As brought out above, it appears that the difficulty heretofore encountered in the tempering of thin glass by the usual method of cooling with air has been due to the fact that such glass cools so rapidly that not enough stress or tension is released therefrom before the temperature of the glass drops below the strain point. My invention is designated to prolong the time interval during which the central layers of the glass maintain a temperature above the strain point so that more time will be allowed for the release of stress. This is accomplished by alternately blowing cold and hot air upon the glass sheet after it is removed from the furnace A and positioned between the blower heads 9 and 10. For this purpose, a mechanically operated reversing valve may be associated with the blower heads for controlling the alternate blowing of the cold and hot air upon the sheet for any desired time intervals.

By way of example, there is illustrated in Fig. 3 one type of reversing valve which may be used in carrying out the invention. The valve is designated in its entirety by the numeral 15 and one of these valves may be provided for each blower head or the two flexible conduits 11 and 12 leading from the blower heads 9 and 10 may be connected with a single valve by means of a common conduit 16. The reversing valve 15 comprises a casing 17 with which the conduit 16 communicates and is also provided with oppositely disposed inlets 18 and 19 with which are associated pipes 20 and 21 respectively leading to hot and cold air blowing apparatus. Arranged within the casing 17 is a reversible valve plate 22 mounted upon a shaft 23 journaled in the side walls of said casing.

When the valve plate 22 is in the position indicated in full lines, cold air is permitted to enter through pipe 20 and pass through conduit 16 to the blower heads. On the other hand, when shaft 23 is rotated to move the valve plate to broken line position, the passage of the cold air is cut off and hot air can then enter through pipe 21 and pass through conduit 16 to the blower heads. Any suitable means may be provided for mechanically reversing the valve at predetermined intervals, but as herein shown, this is achieved by means of a reversible motor 24' operating through speed reduction gearing located in the casing 25. The speed reduction gearing includes a driven shaft 26 upon which is mounted a sprocket wheel 27 and trained about this sprocket wheel and also about a sprocket wheel 28 fixed to the shaft 23 of the valve is a sprocket chain 29. By simply reversing the motor 24, the valve plate 22 can be moved alternately from full line position to broken line position.

The alternate blowing of cold and hot air upon the glass sheet will send a periodic temperature wave through the glass, whereby to effect the required cooling of the glass while, at the same time, retarding the drop in the temperature of the central layers of the glass to a point below the strain point. That is to say, the cold air blast will set up a steep temperature gradient which will create a large stress, and the rate of release of stress will be high since it is proportional to the square of the stress. The hot air blast will not remove any strain by annealing (since it will not raise the surface temperature of the glass to the strain point), but it will prolong the time interval during which the temperature of the central layers of the glass remain above the strain point, thereby allowing more time for the release of stress. The stress which is released above the strain point will determine the permanent strain remaining in the glass after it has cooled to the temperature of its surroundings and the temperature gradient has disappeared. The invention is obviously not restricted to the tempering of glass sheets or plates but instead may be utilized in the heat treatment of any kind of glass article.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of tempering a glass body, which comprises heating the body to a temperature lying between the strain and softening temperatures of the glass, and in then alternately cooling and heating said body to quickly reduce the surface temperature of said body below the strain point of the glass while simultaneously prolonging the time interval during which the temperature of the central layers of the said body remain above the strain point of the glass.

2. The method of tempering a glass body, which comprises heating the body to a temperature lying between the strain and softening temperatures of the glass, and in then subjecting the heated body to alternate blasts of cold and hot air which quickly reduce the surface temperature of said body below the strain point of the glass while simultaneously retarding the drop in the temperature of the central layers of the said body to a point below the strain point of the glass.

3. The method of tempering a glass body, which comprises heating the body to a temperature lying between the strain and softening temperatures of the glass, in then alternately cooling and heating said body, and in maintaining the surface temperature of the said glass body below the strain point of the glass during the cooling and heating while prolonging by such heating the time interval during which the temperature of the central layers of said body remain above the strain point of the glass.

4. The method of tempering a glass body, which comprises heating the body to a temperature lying between the strain and softening temperatures of the glass, in then subjecting the heated body to alternate blasts of cold and hot air, in maintaining the surface temperature of the said glass body below the strain point of the glass while being subjected to the cold and hot air blasts, and in causing the hot air blast to retard the drop in the temperature of the central layers of said body to a point below the strain point of the glass.

HAROLD E. BOWERS.